United States Patent [19]

Yoshida

[11] Patent Number: 4,639,660
[45] Date of Patent: Jan. 27, 1987

[54] SWITCHING CIRCUIT FOR A POWER SUPPLY IN A SIGNAL PROCESSING APPARATUS

[75] Inventor: Masayuki Yoshida, Tokorozawa, Japan

[73] Assignee: Pioneer Electronic Corporation, Tokyo, Japan

[21] Appl. No.: 713,676

[22] Filed: Mar. 19, 1985

[30] Foreign Application Priority Data

Mar. 19, 1984 [JP] Japan ............................ 59-39385[U]

[51] Int. Cl.$^4$ .............................................. G05F 1/44
[52] U.S. Cl. ........................................ 323/266; 363/89
[58] Field of Search .................... 363/86, 89; 323/282, 323/283, 266, 351

[56] References Cited

U.S. PATENT DOCUMENTS 3,702,434 11/1972 Ryan ............................ 323/266 X
3,970,919 7/1976 Butcher ............................ 323/283
4,538,231 8/1985 Abe et al. .......................... 323/283 X Primary Examiner—Peter S. Wong
Attorney, Agent, or Firm—Sughrue, Mion, Zinn, Macpeak & Seas

[57] ABSTRACT

A switching circuit for a power supply in a signal processing apparatus for processing a signal in synchronism with a clock signal having a predetermined frequency, comprising a switching element, driven by a signal having frequency which is in an integer ratio relationship with said predetermined frequency, for receiving a non-stabilized DC voltage, thereby to output said non-stabilized DC voltage intermittently. An electric power supply means controls the DC output voltage to be supplied to an electric power supply line by means of the switching element in order to set it equal to a predetermined value.

3 Claims, 6 Drawing Figures

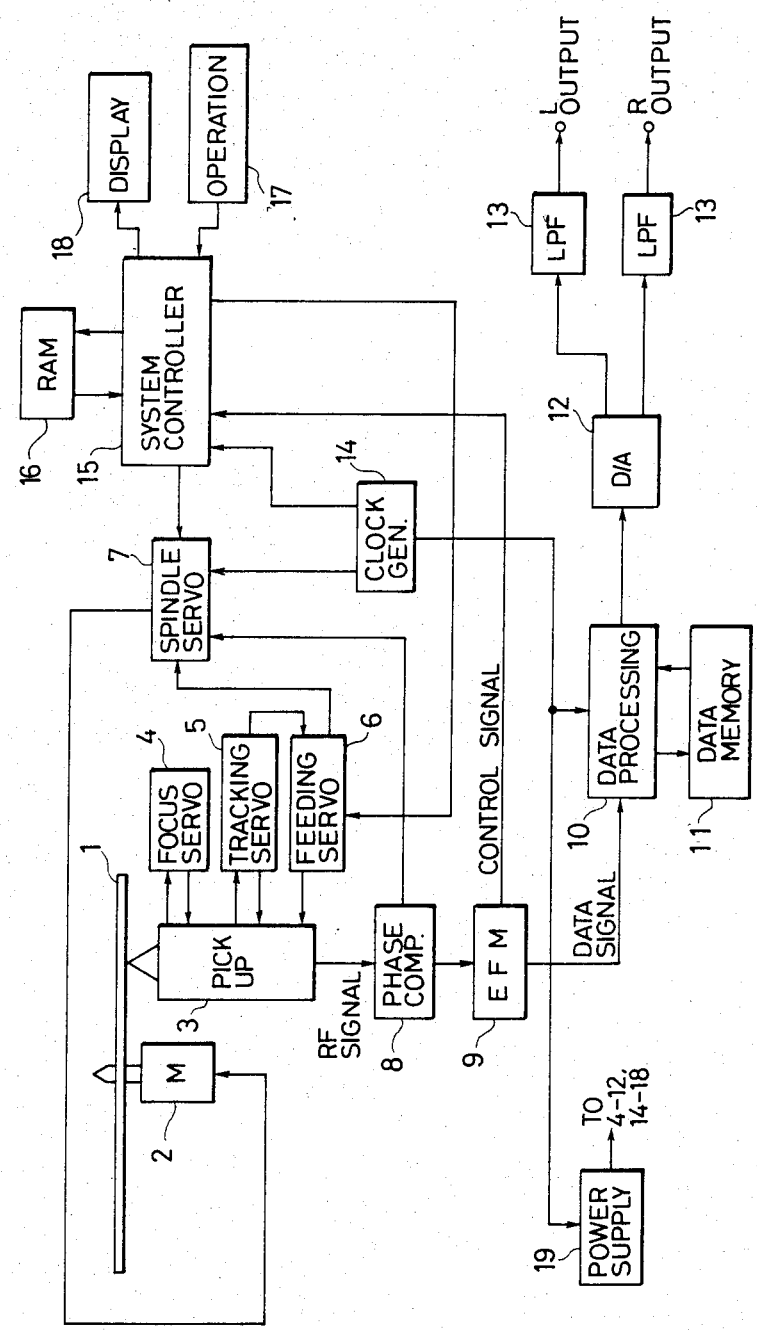

SWITCHING CIRCUIT FOR A POWER SUPPLY IN A SIGNAL PROCESSING APPARATUS

BACKGROUND OF THE INVENTION

The present invention relates to a switching circuit for a power supply in a signal processing apparatus.

In a conventional signal processing device such as a digital audio disk player in which a signal corresponding to audio disk player in which a signal corresponding to audio and operational information is read from a digital audio disk to execute a reproducing process, a switching regulator frequently has been used as the electric power supply. Switching regulators have an advantage over some other types of power supplies in that they emit less heat. Accordingly, only a small heat-sink plate is required which results in a compact electric power supply.

Referring to FIG. 1, a conventional digital audio disk player is shown. In FIG. 1, a digital disk 1 is rotated by a spindle motor 2, and recorded information is read by an opticl pickup 3. In the pickup 3, there ar included: a laser diode; an objective lens; a focus actuator; a tracking actuator; and, a photo-detector. The output signal from the pickup 3 is applied to a focus servo circuit 4, a tracking servo circuit 5, and a phase comparator 8 including at least a radio frequency amplifier. In the focus servo circuit 4, focus error is detected and a focus error signal is generated. The focus actuator installed in the pickup 3 is driven in accordance with the amount of the focus error. In the tracking servo circuit 5, a tracking error is detected and a tracking error signal is generated. The tracking error signal is sent to the tracking actuator in the pickup 3 and to a pickup feeding servo circuit 6. The pickup 3 is moved in the radial direction of the digital audio disk 1 by the output signal from the pickup feeding servo circuit 6.

A spindle servo circuit 7 receives the reproduced clock signal from the phase comparing circuit 8 and a reference clock signal from as reference clock signal generator 14 to detect a difference in phase. The spindle motor 2 is driven such that a track line velocity of the recording disk 1 becomes a constant value. The output of the phase comparing circuit 8 is applied to an Eight to Fourteen Modulation/Demodulation (EFM) circuit 9. The demodulation output of EFM circuit 9 is processed in a data processing circuit 10 in which di-interlace processing, error detection, error correction, error amendment and/or the like is effected. Then, the processed signal is temporarily stored in a data memory 11 and read out by a system clock signal with a constant period from a clock generating circuit 14 thereby to obtain an analog signal by a digital-analog (D/A) converter 12. The analog signal from the D/A converter 12 results in right and left side audio output signals through low-pass filters (LPF) 13.

On the other hand, a control signal included in the data signal from the EFM circuit 9 is supplied to a system controller 15 to read out operational data, such as an intermediate state of a musical composition, an interval state between compositions, the order number of a composition, an audio muting state and the time duration of a composition. The system controller 15 may be composed of a single micro-computer or a plurality of micro-computers. The system controller 15 supplies the operational data to a display device 18, several command signals to the pickup feeding servo circuit 6 and the spindle servo circuit 7, in accordance with the inputted information by an operational section 17. The operational section 17 comprises user controlled keys for setting a musical composition initiating time and a composition terminating time, and for setting operational modes. Numeral 16 denotes a random access memory (RAM) for storing information from the system controller 15. Numeral 19 denotes an electric power supply circuit for supplying electric power to the circuits 4 to 12 and 14 to 18.

As shown in FIG. 2, a commercial AC voltage $V_1$ is applied to a primary coil of a transformer T in the electric power supply circuit 19. An AC voltage $V_2$ is produced from a secondary coil of the transformer T in accordance with the ratio of coil numbers of the primary and secondary coils. The AC voltage $V_2$ is rectified by a full wave rectifier circuit 20 and then smoothed by a smoothing capacitor $C_1$ to obtain a non-stabilized DC voltage. The non-stabilized voltage is converted to an output voltage $V_0$ through a transistor switching element 21 and a smoothing circuit 22 consisting of coil L and capacitor $C_2$. The input terminal of the switching element 21 receives the output from a pulse width controlling circuit 23. The pulse width controlling circuit 23 which is, for example, comprised of a pulse width modulator, is constructed so that the pulse width controlling circuit 23 generates a serrated wave from the output pulse having a predetermined frequency produced from an oscillator 24, and the serrated wave is mixed with the output voltage $V_o$ and the mixed signal is applied to a comparator (not shown) included in the pulse width modulator to compare it with a predetermined reference voltage thereby to produce an output signal corresponding to the result of the comparison. The output signal of the pulse width controlling circuit 23 has the pulse width corresponding to the output voltage $V_o$ and the switching element 21 is controlled by the pulse signal. Thus, a switching regulator is composed of the switching element 21, the smoothing circuit 22, the pulse width controlling circuit 23 and the oscillator 24. The output voltage $V_o$ is controlled so as to be a constant value by controlling the ON-duty time of the switching element 21.

In the conventional signal processing circuit as mentioned above, there are provided two oscillating devices, i.e., one is the clock generating circuit 14 and the other is the oscillator 24. The outputs of the oscillating devices have spurious radiation externally leaking through the commercial power line and the apparatus housing. The spurious radiation has frequency components due to the clock generating circuit 14, as shown by the solid lines of FIG. 3, and due to the oscillator 24, as shown by the dotted lines of FIG. 3. Thus, spurious radiation having many frequency components is undesirably generated and further the overall magnitude level of the spurious radiation is undesirably large. Therefore, it has been difficult in the conventional signal processing apparatus to eliminate the disadvantage caused by spurious radiation.

SUMMARY OF THE INVENTION

The object of the present invention is to provide a switching circuit for a power supply in a signal processing apparatus in which the number of frequency components leaked as spurious radiation is reduced thereby reducing the overall magnitude level thereof, and further to eliminate the disadvantages caused by the spurious radiation.

According to the present invention, there is provided a switching circuit for a power supply in a signal processing aspparatus for processing signals in synchronism with a clock signal having a predetermined frequency, comprising a switching element driven by a signal having a frequency which is an integer ratio of the above predetermined frequency and for receiving a nonstabilized DC voltage, thereby to output the nonstabilized DC voltage intermittently. Electric power supplying means controls the DC voltage to be supplied to an electric power supplying line so as to be equal to a predetermined voltage value by means of the switching element.

BRIEF DESCRIPTION OF THE DRAWINGS

The above and other objects, features and advantages of the present invention will become more apparent from the following description when read with reference to the accompanying drawings, in which:

FIG. 4 is a block diagram of an embodiment of the present invention;

DETAILED DESCRIPTION OF THE PREFERRED EMBODIMENTS

Figure 5:
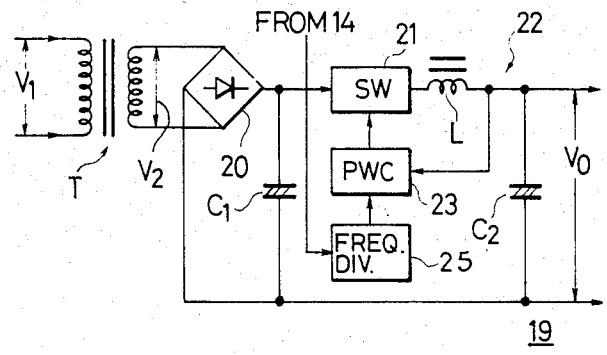
FIG. 5 is a specific circuit diagram of the electric power supplying circuit 19 of the apparatus of FIG. 4.
Figure 6:
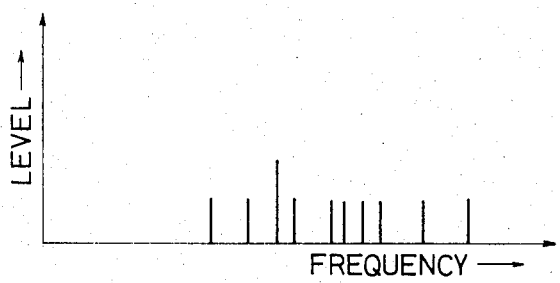
FIG. 6 shows a frequency spectrum of the spurious radiation in the apparatus of FIG. 4.

Referring to FIGS. 4 to 6, the preferred embodiment of the present invention will now be described in detail.

Figure 1:
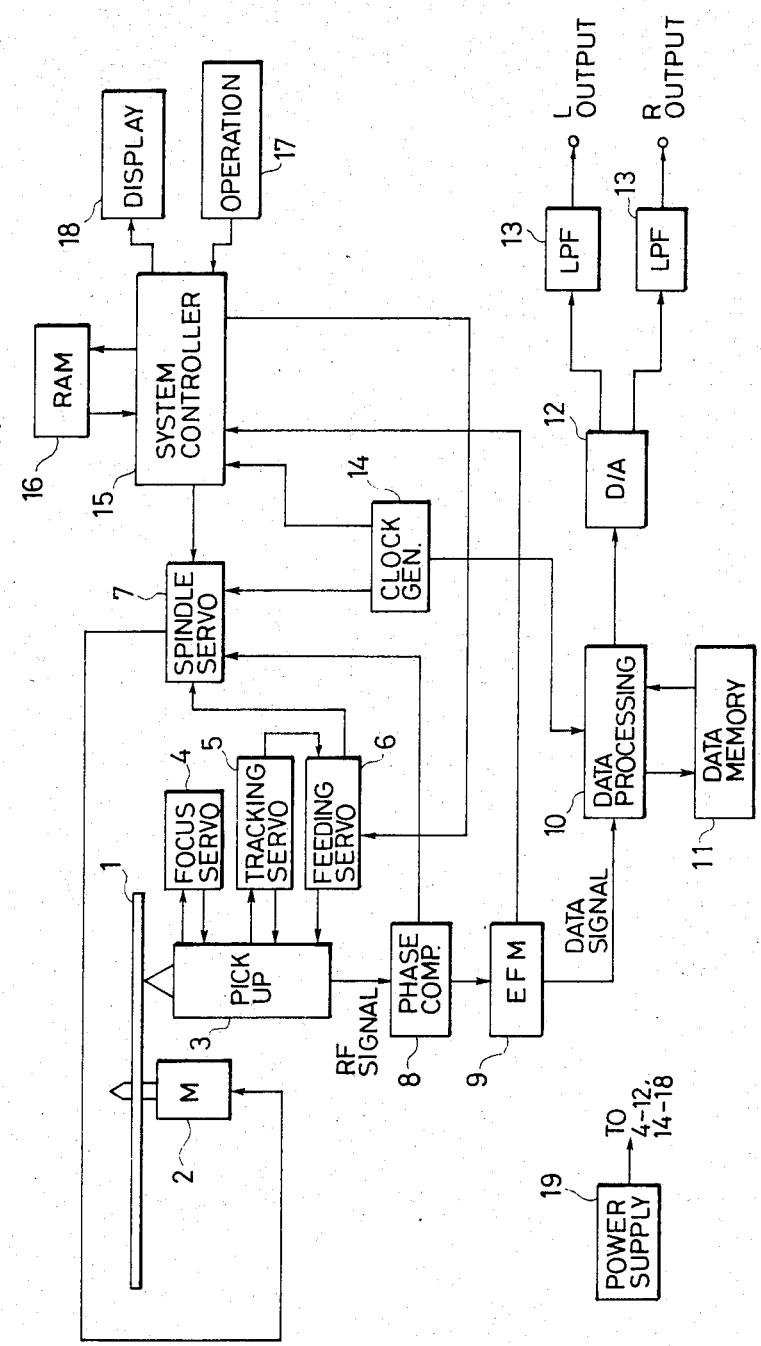
FIG. 1 is a block diagram of a conventional signal processing apparatus.
Figure 2:
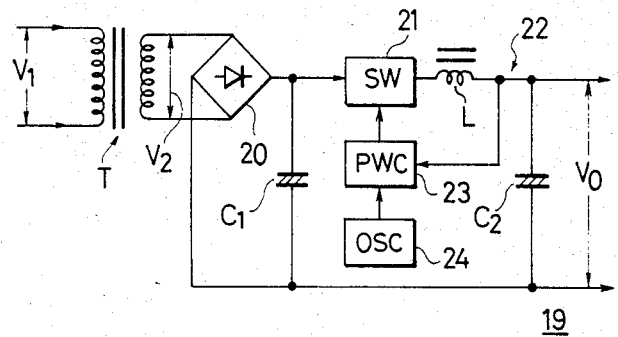
FIG. 2 is a specific circuit diagram of the electric power supplying circuit 19 of the apparatus shown in FIG. 1.
Figure 3:
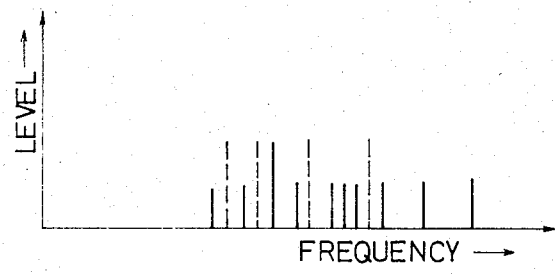
FIG. 3 shows a frequency spectrum of the spurious radiation in the apparatus in FIG. 1.

Referring to FIG. 4, a switching circuit for a power supply in a signal processing apparatus of the present invention is explained. In FIG. 4, the components of switching circuit according to the present invention and their respective connections with each other, as shown in FIG. 1, include: a digital audio disk 1; a spindle motor 2; an optical pickup 3; a focus servo circuit 4; a tracking servo circuit 5; a pickup feeding servo circuit 6; a spindle servo circuit 7; a phase comparing circuit 8; an EFM circuit 9; a data processing circuit 10; a data memory 11; a D/A converter 12; low-pass filters 13; a clock signal generating circuit 14; a system controller 15; a RAM 16; an operational portion 17; and a display device 18. Similar to the device shown in FIG. 1, an electric power source 19 supplies electric power to the circuits 4 to 12, and 14 to 18.

According to the present invention, however, the system clock signal from the clock generator 14 also is supplied to the electric power supplying circuit 19. The electric power supplying circuit 19 as shown in FIG. 5, does not require the oscillator 24 as shown in FIG. 4. Instead a divider 25 is provided for dividing the system clock signal from the clock generating circuit 14 thereby to supply the divided signal to a pulse width controlling circuit 23 which in turn controls the switching element 21.

According to the present invention, the oscillating device is composed of only the clock generating circuit 14. The number and magnitude of frequency components of the spurious radiation externally leaked out as the spurious radiation is reduced as shown in FIG. 6.

Moreover, in the above-described embodiment, there is provided the DC voltage supply arrangement in which non-stabilized DC voltage is obtained by stepping down the AC input voltage by using transformer T and by rectifying and smoothing it. Then, the smoothed DC voltage is stabilized by using the switching regulator.

Alternatively, it may be possible to provide a DC voltage supply arrangement in which non-stabilized DC voltage is obtained by stepping up a DC input voltage by using DC-DC converter. Then, it is stabilized by using the switching regulator. In this case, it is desirable that the DC-DC converter is controlled by using the system clock signal from the clock signal generating circuit 14. Further if a timer, a displaying device or the like operating in synchronism with a clock signal is used in the above embodiment, a clock signal having an integer ratio and obtained from the system clock signal may be used for those circuits.

The present invention as above-described can be applied to any apparatus for processing signals in synchronism with a clock signal, such as a video tape recorder, a frequency synthesizer tuner and the like.

As mentioned above, the present invention has the advantages that the number and overall magnitude of the frequency components leaked as a spurious radiation can be reduced by the arrangement and that the switching element in a switching regulator or a DC-DC converter is controlled on the basis of a system clock signal. Further, the construction of the signal processing apparatus can be made compact by using a single oscillating device.

I claim:

1. In a signal processing apparatus for processing signals in synchronism with a first clock signal having predetermined frequency, a source of said first clock signal, a source of non-stabilized DC voltage, and a switching means connected to receive said DC voltage and to provide an output voltage to a power supply line, the improvement comprising:

a frequency divider means adapted to receive said first clock signal and to generate a second clock signal having a frequency which is in an integer ratio relationship with said predetermined frequency, said switching means being driven by said second clock signal whereby said switching means is adapted to interrupt said non-stabilized DC voltage intermittently to provide a DC output voltage, and electric power supplying means responsive to said second clock signal for regulating said switching means such that the DC output voltage to be supplied to said electric power supply line is set equal to a predetermined voltage value.

2. A switching circuit according to claim 1, further comprising pulse width controlling means for controlling a width of the pulse to be applied to said switching element thereby regulating said switching element, said pulse width controlling circuit connected to an output of said divider means.

3. A switching circuit according to claim 2, further comprising means for maintaining said DC output voltage at a constant value as a function of the ON-duty of said switching element.

* * * * *